(12) United States Patent
Dacosta

(10) Patent No.: US 7,979,516 B2
(45) Date of Patent: Jul. 12, 2011

(54) METHOD FOR DATA SYNCHRONIZATION WITH MOBILE WIRELESS DEVICES

(75) Inventor: Behram Mario Dacosta, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1071 days.

(21) Appl. No.: 11/202,581

(22) Filed: Aug. 11, 2005

(65) Prior Publication Data

US 2006/0056336 A1  Mar. 16, 2006

Related U.S. Application Data

(63) Continuation-in-part of application No. 10/938,802, filed on Sep. 10, 2004.

(51) Int. Cl.
G06F 15/16 (2006.01)
G06F 15/173 (2006.01)
G06F 15/177 (2006.01)

(52) U.S. Cl. ........ 709/221; 709/203; 709/217; 709/224; 709/231

(58) Field of Classification Search .......... 709/220–227, 709/203, 231
See application file for complete search history.

(56) References Cited

U.S. PATENT DOCUMENTS

| | | | |
|---|---|---|---|
| 5,790,952 A | 8/1998 | Seazholtz et al. | |
| 5,805,666 A * | 9/1998 | Ishizuka et al. | 379/1.01 |
| 6,151,491 A | 11/2000 | Farris et al. | |
| 6,252,868 B1 | 6/2001 | Diachina et al. | |
| 6,477,117 B1 | 11/2002 | Narayanaswami et al. | |
| 6,505,200 B1 | 1/2003 | Ims et al. | |
| 6,622,171 B2 * | 9/2003 | Gupta et al. | 709/231 |
| 6,671,525 B2 | 12/2003 | Allen et al. | |
| 6,691,173 B2 | 2/2004 | Morris et al. | |

(Continued)

FOREIGN PATENT DOCUMENTS

JP  2002-152272 A  5/2002

(Continued)

OTHER PUBLICATIONS

Notification of Reason(s) for Refusal, Japanese Patent Office, Patent Application No. 2007-531187, dispatched Dec. 20, 2010, translation (pp. 1-2) with claims (pp. 30-40); corresponds to PCT/US2005/029751 which corresponds to U.S. Appl. No. 11/202,581.

*Primary Examiner* — Joshua Joo
(74) *Attorney, Agent, or Firm* — John P. O'Banion

(57) ABSTRACT

A system and method of non-interactive communication with wireless networks for a mobile wireless device such as a telephone, personal digital assistant (PDA), laptop, or other device configured for performing data transfers with an unreliable network, and the playing back of multimedia received over said network. The invention allows a user to send and receive email, web and other data updates in physical areas and locations of limited signal coverage without the user periodically activating the device for updating data. Furthermore, the invention allows non-interactive receipt of multimedia content for viewing when a network communication outage arises. In one embodiment a second (or subsequent) multimedia stream is received and stored in a data repository for playback when an outage arises. The programming of the device is configured to retrieve the content within the second multimedia stream in response to device programming, user set parameters, learned behaviors and/or non-user based selections.

18 Claims, 4 Drawing Sheets

U.S. PATENT DOCUMENTS

| | | |
|---|---|---|
| 6,735,434 B2 | 5/2004 | Criss et al. |
| 6,741,836 B2 | 5/2004 | Lee et al. |
| 6,813,498 B1 | 11/2004 | Durga et al. |
| 6,831,869 B2 * | 12/2004 | Yamano .................. 365/200 |
| 6,901,066 B1 | 5/2005 | Helgeson |
| 6,950,684 B2 | 9/2005 | Goldberg |
| 7,010,267 B2 * | 3/2006 | Vanluijt et al. ............ 455/41.2 |
| 7,027,773 B1 | 4/2006 | McMillin |
| 7,230,933 B2 | 6/2007 | Bahl et al. |
| 7,249,291 B2 * | 7/2007 | Rasmussen et al. ........ 714/701 |
| 7,299,042 B2 | 11/2007 | Moore et al. |
| 7,457,312 B2 * | 11/2008 | Weiss et al. ................ 370/468 |
| 7,477,890 B1 | 1/2009 | Narayanaswami |
| 2002/0065939 A1 | 5/2002 | Liu |
| 2002/0073170 A1 | 6/2002 | Hoffman et al. |
| 2002/0078248 A1 | 6/2002 | Janik et al. |
| 2002/0178279 A1 * | 11/2002 | Janik et al. ................ 709/231 |
| 2002/0184624 A1 | 12/2002 | Spencer |
| 2003/0115200 A1 | 6/2003 | Anthony et al. |
| 2003/0119568 A1 | 6/2003 | Menard |
| 2003/0140088 A1 * | 7/2003 | Robinson et al. ............ 709/202 |
| 2004/0005873 A1 | 1/2004 | Groenendaal et al. |
| 2004/0009749 A1 | 1/2004 | Arazi et al. |
| 2004/0018851 A1 | 1/2004 | Koenck et al. |
| 2004/0078464 A1 | 4/2004 | Rajan et al. |
| 2004/0131025 A1 | 7/2004 | Dohler et al. |
| 2004/0154041 A1 * | 8/2004 | Zhang ........................ 725/74 |
| 2004/0203998 A1 * | 10/2004 | Knauerhase et al. ...... 455/550.1 |
| 2005/0058153 A1 | 3/2005 | Santhoff et al. |
| 2005/0138143 A1 * | 6/2005 | Thompson .................. 709/218 |
| 2005/0169201 A1 | 8/2005 | Huylebroeck |
| 2005/0216951 A1 * | 9/2005 | MacInnis .................... 725/135 |
| 2005/0226201 A1 | 10/2005 | McMillin |
| 2005/0255856 A1 * | 11/2005 | Griffin et al. ............. 455/456.1 |
| 2005/0256937 A1 | 11/2005 | Lewis |
| 2006/0010472 A1 * | 1/2006 | Godeny ...................... 725/62 |
| 2006/0047815 A1 * | 3/2006 | Hamadi ...................... 709/226 |
| 2006/0069769 A1 * | 3/2006 | Dacosta ..................... 709/224 |
| 2006/0277277 A1 * | 12/2006 | Landschaft et al. ........ 709/220 |
| 2007/0258508 A1 | 11/2007 | Werb et al. |
| 2009/0049170 A1 * | 2/2009 | Schick et al. ............... 709/224 |

FOREIGN PATENT DOCUMENTS

| | | |
|---|---|---|
| JP | 2003-169015 A | 6/2003 |
| WO | 2004003703 A3 | 1/2004 |

* cited by examiner

US 7,979,516 B2

METHOD FOR DATA SYNCHRONIZATION WITH MOBILE WIRELESS DEVICES

CROSS-REFERENCE TO RELATED APPLICATIONS

This application is a continuation-in-part of copending application Ser. No. 10/938,802 filed on Sep. 10, 2004, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

The invention pertains generally to mobile wireless data communications, and more particularly to non-interactive multimedia collection of data associated with a mobile wireless device through a network providing wireless connectivity and subject to communication outages.

2. Description of Related Art

The use of mobile wireless network devices continues on the rise, with network enabled cell phones, personal digital assistants (PDAs), laptop computers, in-vehicle information systems (e.g., On-Star™, map information, routing systems, taxi reservation systems), package carrier tablets (e.g., devices used for registering package receipt and delivery as well as typically collecting signatures), and other applications in which network connectivity is embedded within a portable device.

Wireless entertainment content (e.g., audio/video shorts, sitcoms, cartoons, news, commercials, music, music videos, and so forth) is an area of communication whose use is increasing dramatically. This wireless news and entertainment content is being transmitted to mobile devices over digital networks, such as satellite radio, digital-multimedia-broadcast (DMB), over both satellites and terrestrial connectivity, DVB-T, DVB-H as well as over IP based streaming, such as over CDMA2000 and other cellular networks.

These mobile devices require access to network-based resources in order to retrieve or send electronic mail (email), collect information from other local or remote devices, link with other devices over the Internet to communicate information, communicating news or entertainment content, or accommodate a wide array of content distribution or sharing applications. However, due to the location of the mobile device in relation to the wireless service range and signal conditions, the user may not be able to connect to the network (i.e., Internet) at the desired time. In some cases the location of the wireless device is adequately covered by a provider, . . . . but not the same provider with which the mobile device owner has an account. At other times wireless outages arise having durations on the order of from a millisecond to two seconds, while longer term outages may also arise less frequently.

For example, if a user is carrying the mobile device at a remote location, such as a beach or on an airplane, they may not be able to retrieve their email, respond to email, send email, view the business page, communicate data with remote devices, or view multimedia content, thus depriving operators of potential revenue and frustrating the user base.

Currently, users are required to wait until they are back within range of their own service provider equipment to perform the desired operations. As it is often difficult to know if areas have coverage, the user is left with a random hit-and-miss prospect of attempting to establish connectivity as they journey near the fringes of coverage as affected by geographical, infrastructure, and user positioning (e.g., in relation to buildings, structures, and terrain). Consequently, the user suffers from an adverse experience while sales of wireless devices and wireless content can be impacted.

Accordingly, a need exists for a mobile network device and method which is configured to provide non-real-time wireless network access of non-interactive data. The present invention fulfills that need as well as others, and overcomes drawbacks inherent with previous solutions.

BRIEF SUMMARY OF THE INVENTION

A system and method are described for providing content downloading and non-real-time access to the Internet, or other networks, from a mobile device, when service outages or unavailability arise. The invention provides automated updating in which access is gained to perform non-interactive data exchange, such as to read and send email, update select web site information, update data to and from databases, view multimedia content, view advertising, and perform additional remote connectivity related functionality, despite intermittent lack of availability (outages) for underlying wireless connectivity.

The system and method can be implemented on a wide variety of mobile electronic devices configured for providing wireless network access, including but not limited to: personal digital assistants, satellite communication links, laptop computers, cellular telephones, interactive watches, vehicular data systems and other wireless devices configured for accessing a network which could be inaccessible at a given time. Each of these electronic devices is configured with a transceiver configured for establishing wireless data connectivity and a means for non-interactively updating a selected range of data within a data repository (memory).

In one embodiment the non-interactive updating is preferably performed from within a sleep mode, or low-power mode, in which device functionality is reduced to achieve reduced power consumption levels, such as when the device is not in use and being transported (i.e., lid closed on a PDA or cellular phone). Typically, the sleep mode is entered in response to a manual selection (.e.g., buttons, device closure, device reconfiguration, shape change, storage position engaged, any detectable non-use selection/configuration), or may be less preferably entered automatically in response to the wireless device detecting that the user has not been interacting with the device for a predetermined or variable period of time.

Programming for the network enabled mobile device is configured for automatically accessing a network, which provides wireless connectivity, to communicate data in a non-interactive, non-real-time, data exchange. Communication can be established with other wireless devices as part of a peer-to-peer network, infrastructure network, local-area network, or wide-area network such as the Internet. In this way emails and data are available to the user, although the information is less "timely" than information gathered in real-time. Furthermore, the device can non-interactively provide data over the network to update other devices, for example the sending of emails, database data, status changes, newly collected data, multimedia information (e.g., family photos, project images, and the like), and other forms of content. The mobile device then attempts to establish wireless connectivity either periodically or in response to selected triggers (events), such as signal strength, changes in location, detection of favorable wireless signal conditions, detection of select wireless networks or service providers, and so forth. The unit is also preferably configured for obtaining wireless access through other carriers in exchange for a sufficient financial payment.

The non-interactive data to be communicated wirelessly may comprise any desired data that can be communicated over the wireless network without user intervention. The method is particularly well-suited for communicating electronic mail waiting to be sent, electronic mail awaiting download from the service provider, queries to be posted, responses to be collected, data to update, update data and web sites whose content is to be refreshed, multimedia content (audio, video, or combination), and other forms of non-interactively sent or collected data.

In a preferred embodiment, the user establishes what accesses are to be performed in non-real-time. By way of example and not limitation, emails received, emails to be sent, specific web sites, multimedia content to be received or sent, and other information to be collected or sent, are selected by the user for the device to keep updated in the background while the mobile device is in a sleep, or low-power, mode.

Other embodiments of the invention describe methods for passive and active downloading of content which are particularly well-suited for downloading multimedia content. In passive downloading additional content is downloaded in the background and stored for later playback. In active download mode content that the user downloaded, but is not accessing, is downloaded to memory for access at any subsequent time by the user. These content elements are selected for collection and playback in response to program settings, settings determined in response to the conditions (e.g., length of outage, characteristics of outage, and so forth) and selections from a content provider, service provider, the user, or combinations thereof.

An embodiment of the invention may be described as an apparatus configured for providing mobile wireless data access to a network, comprising: (a) a wireless transceiver configured for establishing wireless data connectivity with a network; (b) a data repository configured for storing data to be sent or retrieved from the network; (c) means for automatically establishing, without user interaction, wireless connectivity; and (d) means for automatically communicating with the network, without user interaction, a selected range of data to, or from, the data repository.

The mobile wireless device (apparatus) is selected from the group of mobile wireless devices consisting essentially of: personal digital assistants, satellite communication links, laptop computers, cellular telephones, interactive watches, vehicle data systems, or other systems which provide wireless network capability and that can benefit from non-interactive updates. The data to be updated can be selected from the group of data consisting essentially of: electronic mail to be sent, electronic mail awaiting download from the network, queries to be posted, responses to be collected, data to update, update data, web sites whose content is to be refreshed, as well as other forms of data that can be non-interactively (automatically) communicated between the mobile device and the network to which wireless communication can be established.

The wireless data network may comprise any network configured for providing wireless network communication, including a wireless peer network, infrastructure network, a local network, or a wide area network such as the Internet. The establishing and communicating of data non-interactively is performed automatically upon awakening the apparatus from a sleep mode, or a low-power mode. Preferably after updating the device returns to sleep, or low power, mode.

An embodiment of the invention may also be described as an apparatus configured for providing mobile wireless data access to a network, comprising: (a) a transceiver configured for establishing wireless data connectivity with a network; (b) a computer configured for controlling the transceiver for communicating data to, or from, the network; (c) a memory coupled to the computer configured for storing data to be sent or retrieved from the network; (d) wherein the computer is configured with a sleep mode, or low-power operating mode, in which reduced functionality is provided at reduced power consumption levels; and (e) programming configured for execution on the computer for, (i) awakening from a sleep mode or low-power mode, (ii) establishing without user interaction wireless connectivity with the network for wireless data access, (iii) communicating with the network without user interaction a selected range of data to or from the memory.

An embodiment of the invention may also be described as an apparatus configured for providing mobile wireless data access to a network, comprising: (a) a transceiver configured for establishing wireless data connectivity with a peer network, local-area network, or wide-area network such as the Internet; (b) a computer configured for controlling the transceiver for communicating data to, or from, the network; (c) a memory coupled to the computer configured for storing data to be sent or retrieved from the network; (d) wherein the computer is configured with a sleep mode (or low-power operating mode), in which reduced functionality is provided at reduced power consumption levels; and (e) programming configured for execution on the computer for, (i) awakening from a sleep mode or low-power mode in response to a time threshold, or a detection of sufficient wireless signal intensity from a network, or a combination of time and signal conditions, (ii) establishing without additional user interaction wireless connectivity with the network for wireless data access, (iii) communicating with the network without additional user interaction a selected range of data to or from the memory including electronic mail to be sent, electronic mail to be downloaded, and web data to be updated, (iv) returning to a sleep mode after the communication is completed or the wireless connectivity is lost.

An embodiment of the invention may also be described as an improvement to a mobile electronics device that is configured for communicating data wirelessly with a network and incorporating a computer processor, memory, and programming for interactive data exchange with the network, with the improvement comprising: (a) a circuit configured for controlling a sleep mode or low-power operating mode in the computer processor of the device which reduces user interactive functionality at reduced power consumption levels; and (b) programming configured for execution on the computer for, (i) awakening from a sleep mode or low-power mode, (ii) establishing, without user interaction wireless connectivity with the network for wireless data access, (iii) communicating with the network without user interaction a selected range of data to/from the memory, (iv) returning to the sleep or low-power mode.

An embodiment of the invention may also be described as a method of non-interactive wireless access of network data by a mobile network enabled device, comprising: (a) selecting, on a mobile network enabled device, at least one access trigger to initiate a network access and non-interactive data to be communicated; (b) entering a sleep mode, or low-power operating mode, on the network enabled device; (c) awakening the mobile network enabled device in response to detection of the access trigger; (d) establishing connectivity over the network for communicating non-interactive data between the network enabled device and the network being accessed; (e) updating the selected non-interactive data on the network enabled device utilizing the network connectivity; and (f) returning to the sleep mode, or low-power operating mode.

An embodiment of the invention may also be described as an apparatus configured for providing multimedia access from a mobile wireless device adapted for communicating over a wireless network subject to communication outages, comprising: (a) a wireless transceiver configured for establishing streaming wireless data connectivity with a network; (b) a data repository configured for storing multimedia data retrieved from the network; (c) means for automatically playing back a first stream (and optionally subsequent streams) of multimedia data received through the wireless network in response to user activity; and (d) means for automatically communicating with the network to receive a second separate stream of multimedia data (and optionally subsequent streams), without direct user interaction, for storage in the data repository for playback when an outage arises in communication from the wireless network.

An embodiment of the invention may also be described as an apparatus configured for providing multimedia mobile wireless data access to a wireless network subject to communication outages, comprising: (a) a transceiver configured for establishing wireless data connectivity with a peer network, local-area network, wide-area network, or Internet; (b) a computer configured for controlling the transceiver for receiving at least a first and separate second multimedia stream from the network; (c) a memory coupled to the computer configured for storing the data of the second multimedia stream as retrieved from the network; and (d) programming configured for execution on said computer for, (i) playing back a first stream of multimedia in real-time in response to user selections while communication remains established with said wireless network, (ii) storing in memory, without additional user interaction, a second multimedia stream (and optionally additional streams such as third, fourth, etc.) received in the background while wireless communication remains established with the network, (iii) playing multimedia content stored in memory from the second multimedia stream in response to detecting an outage in communication on the wireless network.

An embodiment of the invention may also be described as a method of non-interactive wireless playback of multimedia streams on a network device operable on a network subject to communication outages, comprising: (a) establishing connectivity from a network device with the network; (b) receiving a first stream of multimedia data from the network in response to user interaction; wherein the multimedia data can comprise audio content, video content, or a combination of video and audio content; (c) receiving a second stream of multimedia data from the network (and optionally subsequent streams) non-interactively in response to device programming, user set parameters, and/or learned behaviors; (d) storing the multimedia data from the second stream within a data repository configured for storing multimedia data; (e) detecting a communication outage between the network device and said network; and (f) playing back second stream multimedia data stored in the data repository in response to communication outages.

It should be appreciated that the present invention provides a number of beneficial aspects including but not limited to the following.

An aspect of the invention is to provide updating of data associated with mobile wireless network devices that are subject to intermittent, or interrupted, wireless access to a compatible network.

Another aspect of the invention is to provide a sleep mode, or low-power mode, from which from network communications are initiated in response to a time threshold, event threshold, or combination of time and event thresholds.

Another aspect of the invention is to provide a time threshold which comprises at least one set time or at least one set interval.

Another aspect of the invention is to provide an event threshold which is responsive to wireless access availability, such as by detecting if a sufficient network signal level exists for a compatible network.

Another aspect of the invention is to provide an event threshold in which the compatibility of a network can be determined in response to cost factors when connectivity is subject to additional charges.

Another aspect of the invention is to provide an updating mechanism that can be utilized with any mobile network device capable of supporting a sleep or low-power mode, such as personal digital assistants (PDAs), laptops, cellular phones, in-vehicle systems, package tablets and numerous other mobile devices.

Another aspect of the invention is to provide mobile device data updating in which the user can select the data range and depth to be updated.

Another aspect of the invention is to provide mobile device data updating in which the user can select the threshold conditions under which the device is to be activated from sleep mode to attempt network communication.

Another aspect of the invention is to provide mobile device updating in which the user can establish update parameters and an update list for controlling the update process.

Another aspect of the invention is to provide mobile device data updating in which the user can establish parameters for controlling under what conditions connectivity through other networks is to be established.

Another aspect of the invention is to non-interactively download multimedia content either passively or actively.

Another aspect of the invention is to non-interactively download multimedia content within a second communication stream (and optionally additional subsequent streams), established for the purpose, in response to user/content provider/service provider selections, and the available bandwidth of the wireless communication channel.

Another aspect of the invention is to alert the user to outages of service and prompt the user to select multimedia content from the second stream for playback.

Another aspect of the invention is the performing of encoding/decoding using Fountain coding techniques for any of the described forms of non-interactive updating and multimedia data collection and playback.

A still further aspect of the invention is to provide mechanisms for updating other devices and systems to the status or conditions to which a first device is subject, such as for updating a monitoring program to the routes of security guards or a number of other diverse purposes.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 4. It will be appreciated that the apparatus may vary as to configuration and as to details of the parts, and that the method may vary as to the specific steps and sequence, without departing from the basic concepts as disclosed herein.

The invention comprises methods of performing content updates and multimedia data downloading on devices configured for operation on mobile wireless networks, or other similarly "lossy" and/or unreliable networks. Generally the invention describes three categories of updating. A first category is that of updates performed while the wireless device would be otherwise asleep, or in a low power mode (in contrast to the active mode of the device which arises when the user is actively utilizing the device). Another two update methods are adapted for execution when the device is activated but otherwise subject to outages. These modes are referred to as passive updating which is performed in a background mode, and active updating in which communicated content is available for access at a later time. Although described separately, it should be appreciated that the invention can be practiced using combinations of the described aspects without departing from the teachings of the present invention.

In the descriptions herein the term "outage" is meant to indicate a wide range of situations in which the network device is functional and yet communication service is not available. These situations can arise in response to user locations in which signals are blocked, user locations in which signals are not available, interference which blocks receipt of the signal, problems at the transmission site or with specific equipment within the communication equipment in the service area, and so forth.

In the discussion of the invention, portable wireless devices are described, however, it should be appreciated that the invention can be generally applied to any unreliable or "lossy" form of network, medium or service without departing from the teachings of the present invention. The following being provided by way of brief example: streaming from a head-end over unreliable Digital Subscriber Line (DSL) interface, or similarly over satellite services in remote locations, or broadcast from a home-server to mobile wireless receivers within the home.

It is further assumed in the following embodiments that the device is adapted with sufficient memory storage (e.g., RAM, FLASH, fixed media, removable media, and the like) to make adoption of the invention worthwhile on any given network device. It should be appreciated that the continually dropping costs per byte of portable data storage allows significant amounts of data and multimedia to be stored even in low cost network access devices, especially in view of typically low video resolution, without undue cost burden.

Figure 1:
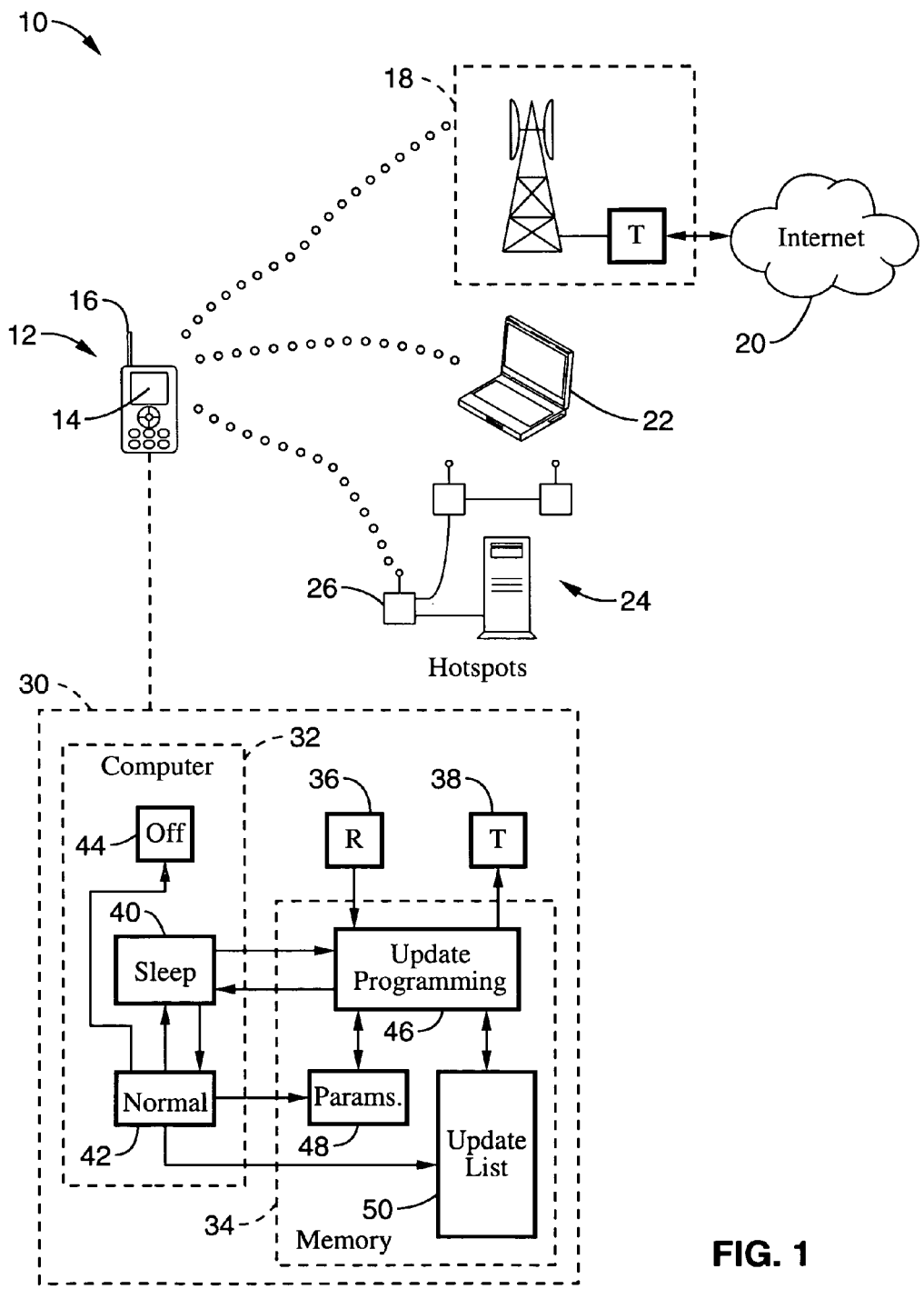
FIG. 1 is a block diagram of a mobile network enabled communications device according to an embodiment of the present invention, shown establishing non-interactive connectivity with various networks.

FIG. 1 illustrates an embodiment 10 of a system configured according to the present invention for performing updates when the device is otherwise off or asleep. A device 12, depicted as a personal digital assistant (PDA), is shown configured with a user interface 14 along with a radio-frequency communication means, including antenna 16 for establishing wireless connectivity.

The wireless connectivity is configured for providing data access through wireless telephone infrastructures 18 to networks such as the Internet 20, directly to other devices 22 such as a laptop computer, as well as to wireless networking grids 24 having one or more hotspots 26, and other wireless communication channels.

The mobile wireless device 12 according to the invention is configured with circuitry 30 having a computer 32 and memory 34 as well as at least one wireless receiver 36 and wireless transmitter 38 (i.e. transceiver). It should be appreciated that wireless communication can be provided for one or more wireless standards, such as cellular wireless, WiFi (IEEE 802.11), WiMax (802.16), Bluetooth™, and so forth. The inclusion of multiple communication channels provides multiple mechanisms by which connectivity can be established.

Aspects of the invention according to one embodiment are represented within computer block 32 and memory block 34. The computer is configured with a sleep mode 42, or alternatively another form of low-power mode, during which operation is at least substantially suspended to reduce power consumption. Typically, the device is configured for being utilized while in normal execution mode 42, or being turned off 44. A sleep mode 40 is utilized within processor 32 to allow the device to be activated in response to reaching a specific time, an elapsed time, an event condition or combination thereof.

The device is configured to be awakened from sleep mode 40, wherein it can execute communication update programming 46 which controls utilization of receiver 36 and transmitter 38, if any wireless connectivity is available. If connectivity is available then a communication can be performed according to the update parameters 48 wherein a communication is established which updates the elements found in an update list 50. The update list preferably details both the web sites, or portions thereof, and depths to which updating is to be performed. It will be appreciated that aspects of the update parameters and update list can be established or changed by programming executing in normal mode, such as a front end for the update communications applications of the present invention.

It should be appreciated that the present invention can be implemented as a combination of hardware and software, or as software-only for execution on a mobile wireless device that is already configured to provide wireless connectivity as well as sleep or low-power operating states that can be over-ridden in response to time or event. Therefore, the present invention can be supplied as a computer-readable media (e.g., disk, memory card, USB memory device, removable media, or similar data repository) which can be read and then executed by a particular mobile device.

One embodiment of the invention can be operated according to the following scenario, which by way of example considers the portable device to be a personal digital assistance (PDA). The following scenario generally describes establishing wireless connectivity over the Internet, however, it should be appreciated that wireless connectivity according to the present invention can be established directly with another device (i.e., updates performed between a laptop and PDA, and other forms of peer-to-peer communication, and other non-Internet forms of content and data interchange), or through proprietary wireless or wired networks.

Figure 2:
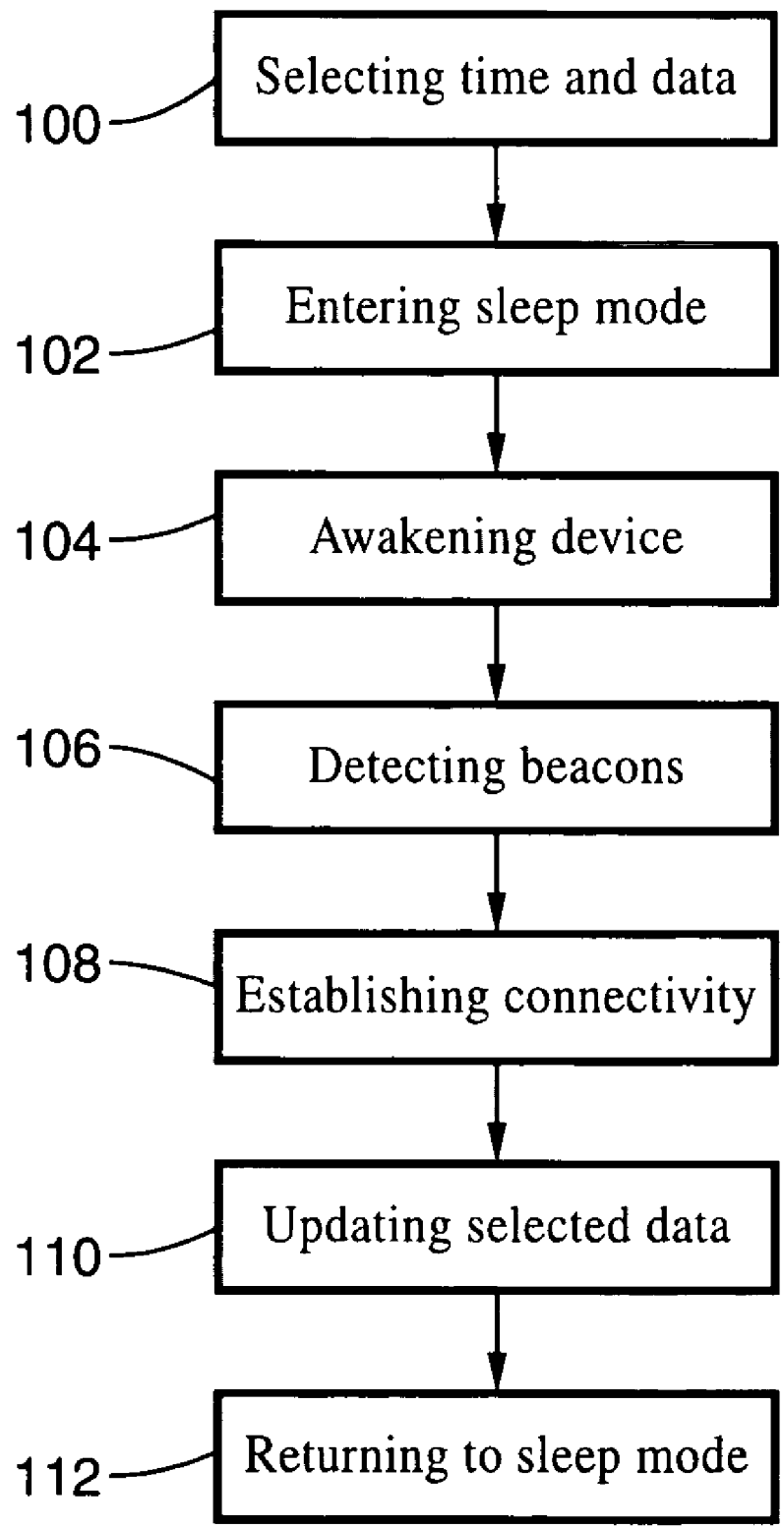
FIG. 2 is a flowchart of non-interactive network connectivity according to an embodiment of the present invention.

FIG. 2 illustrates an example embodiment of communications updating which generally depicts the primary aspects of the method. The user selects how the update is to be performed within the system, such as selecting time/event awakening and the data to be updated as represented by block 100. The data to be updated can comprise both breadth and depth selections providing significant user control of what data is to be updated. Preferably, the system is configured to allow the user to also indicate the hierarchy of updates, which can also be considered a priority. The user-interactive control of the update list and parameters of the invention are performed within an application that executes during normal operation of the device.

After the user is finished utilizing the device in a normal operating mode the device is shut down in a manner wherein it will enter a sleep mode (or low-power mode) as depicted by block 102, such as closing the user interface of the device, without completely turning off the power. Alternatively, other methods may be utilized for selecting a sleep or reduced-power operating mode.

In response to time and/or event the device awakens from sleep mode as per block 104 and commences executing the update operation. Prior to establishing connectivity it is preferable that the unit attempts to detect the presence of signals, such as beacons, which indicate the specific forms of wireless connectivity which may be available at the given location. This beacon detection is shown executed as block 106. After programming detects what is available it compares this against the update parameters and update list to determine, based on what needs updating, the type of connectivity to be established. Wireless connectivity is established as per block 108 after which the data listed in the update list, or a portion thereof, is updated using the established connection. After all desired updates have been performed, insofar as the connectivity is still available, the programming returns the device to a sleep mode as per block 112.

Figure 3:
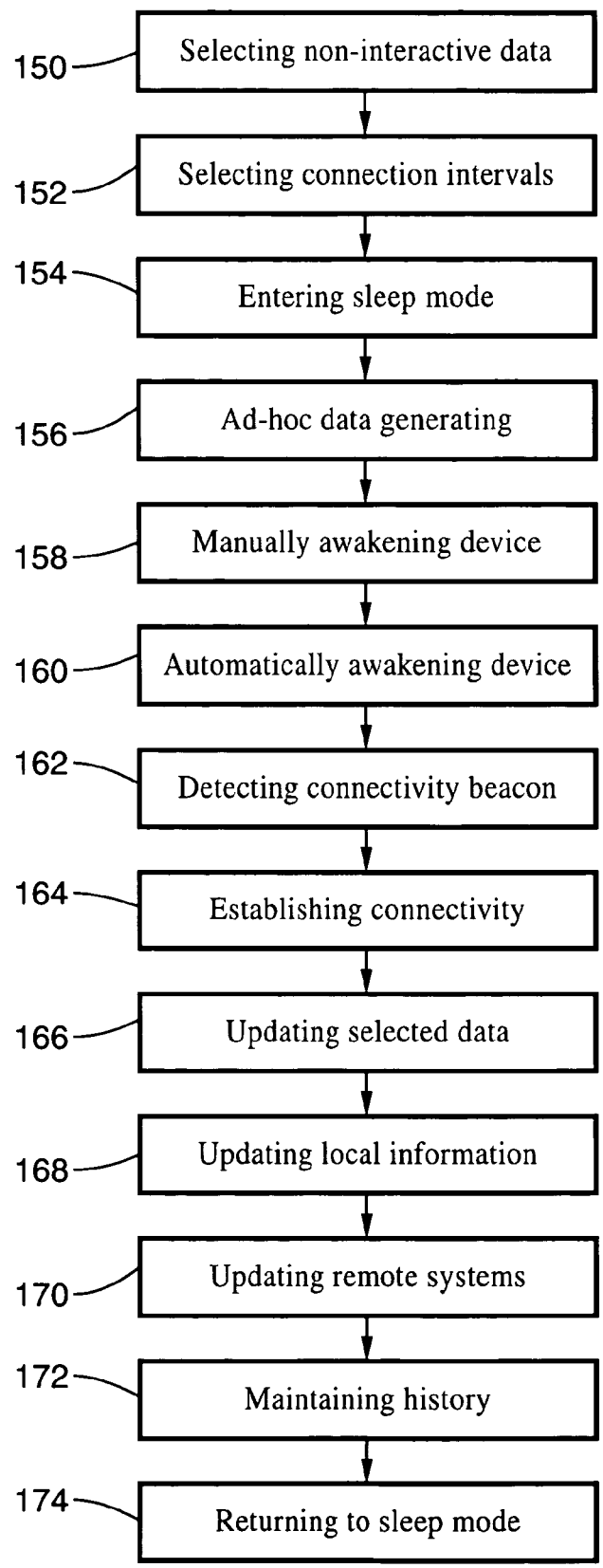
FIG. 3 is a flowchart of non-interactive network connectivity according to another embodiment of the present invention, showing the inclusion of optional aspects of the invention.

FIG. 3 illustrates an embodiment of the updating method according to the present invention which includes additional details and a number of optional features which can be incorporated separately or in various combinations.

As represented in block 150 the update communications application according to the invention is configured for interacting with the user for selecting non-interactive data to be communicated. The control application for the non-real-time updates establishes what data is to be communicated automatically during the time the PDA is retained in sleep mode. The breadth and depth of updating can be user selected. Optional mechanisms can be provided wherein the device programming automatically determines possible update targets, such as in response to historical use of the device. In another option the elements to be updated may be selected in a hierarchical order, so that in response to intermittent connections it is assured that the most important information is communicated first, prior to a loss of connection. For some data, such as web sites, the breadth and depth of updates should be selected.

By way of example, a user may want updates on the business page of a news site including a stock market update. They may specifically request access to all new technical articles in that business section. The user therefore can establish the breadth and depth of what is to be maintained. In addition, the content selection can also be optionally marked according to priority, so that the system can determine which content is worthy of being communicated if intermittent connection exist or if connect charges are applicable, such as for other carriers.

As mentioned above, device programming can be optionally configured for monitoring user accesses to web sites and creating a hierarchy of importance that could be selected by the user. Preferably the device is configured to allow the user to edit the list, and to add indices into the list according to importance (i.e., highest priority, medium priority, and background—low priority).

In block 152 the programming is configured to allow user selection of times, intervals, or events during which update communications are to be attempted. For example, the control application interacts with the user to select the interval (i.e., in increments of minutes, tens of minutes, half hours, and so forth), at which updates and synchronization are to be performed with the Internet based resources. In this example, the user may select two hours as the update interval. Optionally, the intervals (periods) can be made contingent upon specific times (e.g., on the hour, half-hour, or other period/time relationship), connection availability, event occurrence, time since last connection was established, or other parameters. Typically, a default pattern for the time/event specifier can be established by the user, so that the device is kept up to date when non-real-time mode is activated. Optionally, the user can select special modes of activity, for example selecting under what circumstances connectivity with other carriers is to be established which may incur additional charges. For less important communication needs, the device allows the user to establish connectivity parameters based on connect time charges and the like, wherein less important data subject to little change, such as web sites, are collected during non-peak times.

In block 154 the programming is configured to allow the user to select data to be immediately updated, for example generating data to be sent such as an electronic mail message (email). Execution of certain applications, such as email composition applications, can increase the amount of data to be updated when connectivity becomes available. It should be appreciated that connectivity may not be available at the time the email is created, wherein the programming is preferably configured to flag the email for sending during the automated data update process. Incoming data could also be required, in particular when utilizing certain applications that rely on web based data (i.e., XML, and so forth), or data otherwise retrieved directly or indirectly from other systems utilizing the wireless connectivity.

Aside from email composition applications it should be noted that a number of applications can be executed that otherwise create or determine data that is to be sent out over the wireless connection. The programming can be configured as a default, or in response to user input, for marking created data for immediate sending even if no connectivity is presently available. Device programming subsequently automatically establishes connectivity as soon as a connection is detected over which the data can be sent out.

In block 156 programming and/or user activity direct the device to enter sleep mode. For example the user may close the lid of the device, such as PDA, or otherwise select a sleep mode without powering off the mobile device. If a sleep mode synchronization was selected by the user the timer circuit continues to operate to awaken the device periodically, and/or in response to triggers (events), such as in response to signal strength, connection availability, user key input or combination, and so forth.

In block 158 programming is shown detecting manual awakening of the device by the user. This is an option in which device programming can respond to selected user input which "overrides" the periodic awakening sequence so that a connection attempt is made immediately. The device need not be triggered into a normal operating mode, but can be utilized to allow the user to intervene in selecting possibly appropriate times for establishing connectivity.

The manual awakening, for instance, may be performed by a traveling user when they believe their location has an increased probability of connectivity. Examples include a user that has walked outdoors on a break away from signal attenuating structures, a driver stopping near the crest of a hill, or getting out away from a city, and a number of other scenarios in which the conditions have changed or the urgency has changed in updating the information, including the sending and receiving of electronic mail.

For example, the programming is preferably configured to be awakened from sleep mode in response to a selected button press or combination of button presses. Once awakened, the device attempts to establish wireless connectivity for communicating the desired non-interactive data as previously established by the user. After the updating operation is performed the unit can return to sleep mode. It will be appreciated that the programming is preferably configured so that in response to a successful update triggered by a manual operation, the timing of automated time-based awakening is reset.

In block 160 the programming is configured to automatically awaken the device based on time or events. In one mode the device awakens periodically, such as every two hours in this scenario. Alternatively, or additionally, the device can be awakened when conditions appear conducive to the establishment of a connection, such as based on signal strength, beacons, and so forth.

In block 162 the programming can determine if wireless connectivity is available, and preferably what types of wireless connectivity is available. This is preferably performed by detecting the presence of beacons which determine if wireless connectivity exists while signal strength and parameters of the beacons indicate which forms of wireless connectivity can be established. Furthermore, the communication routines can interact with available networks if additional information is necessary about the network. For example the receiver circuitry may be activated every two hours for detecting what wireless connectivity can be established.

A check is performed to determine if the beacon corresponds to a service provider with which the user may successfully communicate, such as being able to connect through a primary service provider of the user, a WiFi hotspot, a direct connection with a related user device, or another service provider which may require the payment of fees in order to utilize the communications channel.

In block 164 connectivity is established for performing the update. In one embodiment of the invention, based on the update parameter settings the programming determines which of the available connectivity options provides the least cost service to satisfy (at least) the most important of the required updating. Preferably, service is available by the service provider of the user, however, in other cases the system determines if connectivity should be established using alternative services, such as those requiring additional per minute charges.

Additionally, the extent of non-interactive data to be communicated is selected based on user established preferences, so that connectivity is not to be paid for when the data is not very important, such as updating of non-priority web sites. If alternative connectivity is available on a per time basis (i.e., minute or second) then a financial transaction can be initiated such as using telephone payment infrastructure, an internet payment service, credit card, or other means of paying for the connectivity.

In block 166 updating is performed over the established communications link with data being input or output according to the update list and a default, or user defined, hierarchy. For example a hierarchy may order updates as: sending outgoing emails, retrieving incoming emails (i.e. from selected parties, non-Spam, without attachment, or based on other selection criterion), high importance data synchronization is performed (i.e. contact database or other corporate information), and content from selected web sites is updated, such as new feeds, industry information, blogs and the like.

The types of communication and synchronization are performed in response to the types of connection established and the type of service provider. For example, if the present link is a low-rate GPRS wireless link, device programming may elect to only transmit outgoing email. However, if the link is a high data rate WiFi link, the PDA may choose to synchronize all content including video content. If the WiFi link is a "free" link without confidentiality (WEP-type privacy), VPN, or a secure website, device programming according to the invention can choose to restrict downloading to non-proprietary content, such as updating of selected web sites (i.e. news feeds and the like).

The update list is changed to indicate the status of each of the update items, along with preferably the time the update was performed. The programming is preferably configured to alert the user to these updates, or more preferably the user is only alerted to updates that they have marked for generating an alert when configuring the update list, in response to an update being performed which retrieves different content.

Once important communications have taken place, any accelerated updates automatically revert back to default conditions in which normal periodic updates are attempted.

In block 168 an optional process of updating local information can be performed. In this mode of the invention, device programming in response to detecting the presence of local connectivity, such as WiFi "hot spots", automatically performs downloads of selected content, such as maps, alerts, weather, local news, announcements, closures (i.e., ride availability at a theme park), sales, and so forth. It will be appreciated that a standardized hierarchy would be preferably established for "hot spots" with regard to the structuring and categorization of data configured for being automatically disseminated wirelessly, wherein the collection of local data can be well-controlled and seamless as the user traverses different networks containing hot spots.

In block 170 an optional process is depicted for updating remote systems. The device programming in this case optionally updates remote systems to status relating to the mobile device, or the associated user. For example, the location and/or track path of an individual such as a security guard making his rounds, or an individual on parole whose whereabouts are being monitored as part of a condition for release. By way of further example the device can communicate the vital statistics of a patient, or changes thereof, in response data collected from one or more sensors attached to the mobile device.

In block 172 an optional process is depicted in which the programming is configured for maintaining a history of wireless communication updates (logging), along with durations and connect time charges for review by the user. This aids the user in making intelligent decisions with regard to how timely the communications are to be performed.

In block 174 the programming has completed the update process, or the link is no longer available, wherein a return to sleep mode (or other low-power mode) of the device is provided. Prior to entering sleep mode again, internal timing for any ongoing connectivity attempts, such as future updates, are established.

It should be appreciated that duration of a sleep period can be set by the programming to take into account the elapsed time since the previous update was performed. For example, if connectivity has not been available for three hours even though the timer is set for two hours, then the unit more frequently checks for availability of connectivity.

The following describes embodiments of the invention which operate when the device is powered-up and preferably active. The hardware utilized can be the same as that described for FIG. 1 and can share a number of those aspects, however, the sleep or power-down modes are not necessary in these embodiments. Although any data can be communicated using the following embodiment, it is particularly well-suited for allowing the user to playback downloaded content, such as video or audio, when a communication connection, such as wireless connectivity, is not available. Alternatively, the method can be used for communicating electronic mail, collecting responses, collecting data updates, updating web site content and so forth in the background. Content downloading according to the present invention can be performed as a means of passive downloading, or active downloading.

During passive downloading, a second or additional stream of content or data, are transmitted to the mobile device simultaneously with the primary (first stream) content being viewed/listened to, without the explicit awareness of the user. The data rate available to the second stream depends on the activity of the first stream in response to user selections, and the available bandwidth of the communication channel. For example, the data rate available to the second stream is constrained at less than that available to the first stream while the user is playing content from said first stream. Likewise the data rate available to optional streams beyond the second stream can be limited in response to the use and available bandwidth of any higher-order streams, such as first and second streams.

During brief periods when the user is not playing first stream content, or is playing first stream content at a data rate less than the available bandwidth, then the second stream can utilize all remaining bandwidth, until the streaming demand according to said first stream increases. In other words device programming according to the invention, constrains the bandwidth allotted the second stream (and any subsequent streams) to a minimum value (e.g., zero, fixed value, variable value, value in response to conditions, value in response to user settings controlling first and second stream) when said first stream is subject to any bandwidth limitation (i.e., playback data rate<available bandwidth). Otherwise said second stream may utilize any bandwidth not needed in supporting playback of the first stream.

It will be appreciated that in one mode of operation the programming accords the second stream a minimum (e.g., fixed, user selected, or learned) bandwidth if passive data is to be collected. The minimum bandwidth accorded the second stream can be modulated by the programming in response to the bandwidth needs of the first stream.

The second stream content is preferably stored on the mobile device by a "background" task, and the content can be accessed at any time by the user. For example, background multimedia content, such as video or audio streams, can be played if and when wireless outages arise. Multimedia content, for example, may include News sound-bytes, music videos, weather, and commercials. The second stream is stored in said data repository in response to current conditions, device programming, learned behaviors (e.g., registering and storing patterns of access by the user), user selection, service provider selection, content provider selection, and so forth. In one mode the selection of items to collect within the second stream are selected by the user.

By way of example, and not limitation, with the cursor over a multimedia link the user can perform a right mouse-click operation (or similar) to open a menu containing a 'download in background' selection. Upon selecting this option, the system programming establishes this multimedia content to be downloaded from the link as its new priority (or a new priority subject to other priority selection criterion or status), and then continues collecting any other content selected by the user, or other party (e.g., service provider or content provider). It should be appreciated that download priority in the background download process can be selected as well (e.g., user, service provider, content provider, or others), or subject to other predetermined or selected mechanisms for example: first-in first-out, round-robin, according to type of content such as giving business data higher priority than entertainment data, and so forth. Optionally, the user can be alerted to which content has become available, such as in response to completing the download of the item from the second stream.

In another mode of the invention, the content collected within the second stream, and any subsequent stream(s), is determined by a party other than the user. For example, the content of second and subsequent streams may be determined by the content provider (i.e., from whence was received the first stream), from the wireless service provider, from a paid advertiser through the content provider or service provider, or other parties affiliated with the system. By way of example, the second stream may comprise News Highlights, preferably in a low bandwidth format.

In addition, the content collected may be collected conditionally, for example so that the content played to the user depends on the length of the outage, or the type of outage. In one example a single screen of information, (e.g., single sentence news text, jokes, famous quotes, advertising such as small logos and text, and the like as well as combinations), and so forth may be collected periodically for use when the service interruption is of only a few seconds duration. The data may therefore be collected for different purposes, such as in a hierarchy. The single screens of data may be collected, and then once displayed they may be replaced with additional screens of data, therein keeping what is flashed to the user during an outage fresh. It will be appreciated that the present system is configured to provide numerous mechanisms for collecting content in response to a wide range of applications, user selections, content provider selection, and wireless service provider selections.

It should be appreciated that determination of the content collected in the second stream, and optional subsequent streams, can be determined from any of the processes described above as well as, combinations of these processes, and combinations with known content collection mechanisms, without departing from the teachings of the present invention.

It will be appreciated that the above content collection process is still non-interactive, as that term is known, for after the selection is made the user continues to interact with the first stream data while the second stream is collected without user interaction for access at a later time. The second stream generally collects at a low non-real time data rate.

The first stream may also be similarly stored in the data repository, with selecting of the portions to be stored performed in response to device programming, user set parameters, learned behaviors, and/or explicit user directives. In one embodiment only the first stream is stored for retrieval during service interruptions. In a combination of the two, parameters (set by user or providers) may define entire sets of content for collection in the background (second stream and optionally subsequent streams), for which content being interactively accessed in the first stream may comprise a subset. In response, the system is configured to retain content at the union between the background content selection and the interactive content accesses, thereby eliminating duplicative content access.

The background content is not played while it is being streamed to the device, but is played only from local storage (e.g., RAM, FLASH, compact hard drive, replaceable media, and so forth). The transmission of this background content can occur at rates substantially below that of real time communication, and furthermore need not be transmitted with a similar level of reliability afforded to real time access. In addition, the small size of the media files which are to be played back on limited resolution devices like telephones, PDAs, and the like make them well-suited for being communicated using Fountain forward error correcting techniques.

The device according to the invention is configured with a means for detecting the communication outages and determining what is to be played back. In one mode, the system can play back content selected by the service provider or content provider. The selection of content can depend on the length of the outage. For longer outages the user can be optionally prompted to select what is to be played back from the data repository. For example the user can select to playback multimedia which was collected from the secondary stream, such as subject to a restricted data rate during collection, or from the primary stream which may have already been subject to viewing by the user.

Once a restoration of wireless service is detected by the system (i.e., device no longer subject to a communication outage), then the user can switch back to accessing real time content. In one embodiment, the switch is performed automatically, unless the user indicates otherwise. In another mode the user is alerted and given the option to switch back to real time access at any desired time. Pre-stored content can be selected by the user for retention as background content therein allowing the user to maintain background items for viewing at a time when service is not available. By way of example, in one mode the system is adapted to display a menu from which the user may select content to be played during outages.

In another embodiment the content played during the interruption is not user selected, but may be determined by the content provider or service provider. In one mode the non-user selected content is played in response to short duration outages on the order of a few seconds, wherein these entities can both provide an alert to the outage with the alert screen also containing useful information and/or paid advertising. It should be appreciated that content can be played during an outage according to any separate mechanism described, combinations of those mechanisms, and any of the mechanisms or combinations thereof in further combination with playback aspects known to one of ordinary skill in the art, without departing from the teachings of the present invention.

During active downloading mode, the device can download to local storage the primary and/or secondary content that is being transmitted, either on explicit command by the user, or in the background without explicit knowledge of the user. The downloads take place at any convenient times, as determined by bandwidth availability as well as programmed configurations, user selected control parameters and learned behaviors. This aspect of active downloading performs in a similar manner as the sleep mode updating described earlier. The system can support any desired mix of data, audio streams, video streams, and combinations thereof which are communicated on the primary stream or secondary stream.

It should be appreciated that the secondary stream and any existing subsequent streams (e.g., video, audio, etc.) according to one mode can be presented automatically to the user, or in another mode performed in response to a single button request by the user when outages arise. It should also be understood that according to one aspect of the invention the streams can be downloaded to the mobile device via another communication channel, and/or displaced temporally (in response to time), such as during the previous day by a device other than over the primary content access network. For example, the content may be downloaded over local connectivity to a system at the user's residence or via USB during charging of the mobile device. This form of content can be downloaded into the device according to any of the embodiments described herein.

Figure 4:
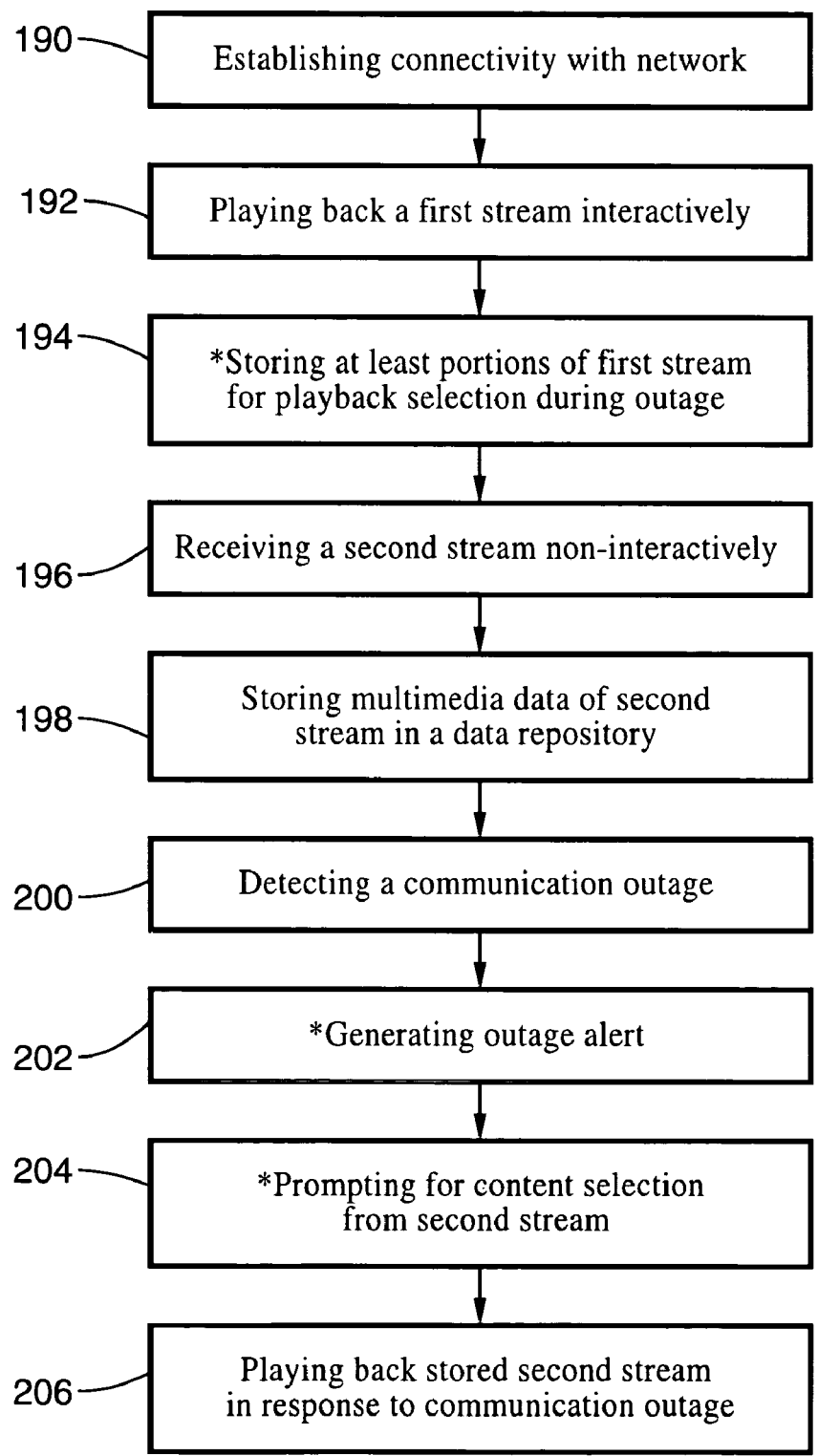
FIG. 4 is a flowchart of non-interactive multimedia content downloading according to another embodiment of the present invention, showing data being collected in a second stream and subject to optional aspects of the invention.

FIG. 4 illustrates an example embodiment of the process by which content can be collected prior to the outage and played back during an outage. Represented in block 190 is the establishing of connectivity with the unreliable network, such as a wireless network or other form of network subject to communication outages. In block 192 is depicted the playing back of a first stream of multimedia interactively, under user control. Optionally, as represented by block 194 at least portions of the first stream can be stored for playback selection during an outage. The content stored may comprise content which has already been played, or content which was collected but not yet viewed, and so forth. Receiving a second (or subsequent) stream of multimedia data is performed by the device as per block 196 in which the data is received non-interactively.

As per block 198 the storing of second stream multimedia data in a data repository is performed. Detecting a communication outage is shown in block 200, and the user may be optionally alerted to the outage as in block 202 and optionally prompted to select the content to be played back as per block 204. The content selection may allow the user to select content collected within the second stream, and/or content collected in either the second stream or the first stream. Alternatively, the content to be played may be determined by the provider (content or service), in particular the service provider may provide timely multimedia data for display when during short outage periods.

Finally, stored multimedia content is played back to the user as represented in block 206 when new content cannot be received due to the communication outage. The system is also preferably configured so that the collected background content can be accessed by the user at any other time in response to directives from the user. Once communication is restored, the user is preferably alerted and can continue perusing the collected content, or return to an interactive mode, which may include executing operations which were stopped when the outage arose.

It should be appreciated that the above embodiments can be controlled by the user through both configuration, loading of use parameters, learning of user activity and use patterns, and real time user selections. It will be further appreciated that control of these embodiments and modes can be supported using a number of different forms of interfaces, without departing from the teachings of the present invention.

The present invention describes a method and system for performing non-real-time data updates over a wireless connection to a network. A number of novel aspects of the invention are disclosed which may be practiced separately or in various combinations without departing from the teachings of the present invention. It will be appreciated that implementation of certain aspects of the invention would be known to one of ordinary skill in the art, wherein these implementation details have been typically omitted herein.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus configured for providing multimedia access from a mobile wireless device configured for communicating over a wireless network subject to communication outages, comprising:
a wireless transceiver configured for establishing streaming wireless data connectivity with said wireless network;
a data repository configured for storing multimedia data retrieved from the wireless network;
programming stored in memory configured for:
automatically playing back a first stream of multimedia data received through said wireless network in response to user activity;
automatically monitoring the first stream against an available bandwidth;
automatically communicating with the wireless network to receive a second separate stream of multimedia data when not playing the first stream or when the first stream is played at a data rate less than the available bandwidth, without direct user interaction, for storage in said data repository for playback when a communication outage arises between said apparatus and said wireless network;
periodically collecting content in said data repository;
detecting said communication outage;
alerting a user of said apparatus to said communication outage and either providing options to the user with regard to playing back content stored in said data repository from at least said second separate stream or playing back the periodically collected content in response to detecting said communication outage and based on a length of said communication outage; and
playing back the second separate stream multimedia data stored in said data repository in response to said communication outage.

2. The apparatus as recited in claim 1, wherein said apparatus is selected from a group of mobile wireless devices consisting essentially of: personal digital assistants, satellite communication links, laptop computers, cellular telephones, interactive watches, package carrier tablets and vehicular data systems.

3. The apparatus as recited in claim 1:
wherein said multimedia data comprises audio content, video content, or a combination of video and audio content;
wherein said wireless network comprises a wireless peer network, a local network, a wide area network, or the Internet;
wherein said second separate stream is stored and not immediately played at the time of receipt; and
wherein the multimedia data stored in association with said second separate stream is available to the user of said apparatus when a communication outage arises.

4. The apparatus as recited in claim 1, further comprising additional separate multimedia content streams which accompany said second separate stream and are received without direct user interaction for storage in said data repository for playback when an outage arises in communication from said wireless network.

5. The apparatus as recited in claim 1, wherein said automatically communicating with the wireless network to received the second separate stream is configured to retrieve multimedia streams and store the first stream and second separate stream in the data repository in response to device programming, learned behaviors, user selection, service provider selection, and/or content provider selection.

6. The apparatus as recited in claim 1, wherein content of said second separate stream is retrieved from said data repository and played back in response to length of outage, device programming, learned behaviors, user selection, service provider selection, and/or content provider selection.

7. An apparatus configured for providing multimedia mobile wireless data access to a wireless network subject to communication outages, comprising:
a transceiver configured for establishing wireless data connectivity with a peer network, local-area network, wide-area network, or Internet;
a computer configured for controlling said transceiver for interactive retrieval of multimedia streams including a first multimedia stream from the wireless network and non-interactive receiving of at least a second multimedia stream from the wireless network;
a memory coupled to said computer configured for storing data of said second multimedia stream as retrieved from the wireless network; and
programming configured for execution on said computer for,
playing back the first multimedia stream in real-time in response to user selections while communication remains established with said wireless network,
monitoring the first multimedia stream against an available bandwidth;

storing in said memory, without additional user interaction and when not playing said first multimedia stream or when said first multimedia stream is played at a data rate less than the available bandwidth, the second multimedia stream received in background while wireless communication remains established with the wireless network;

periodically collecting content in said memory;

alerting a user of said apparatus to a communication outage on said wireless network and either prompting the user of said apparatus to select from said data received from said second multimedia stream or playing back the periodically collected content in response to detecting said communication outage and based on a length of said communication outage, and playing multimedia content stored in said memory from said second multimedia stream in response to detecting said communication outage on said wireless network and said prompting said user.

8. The apparatus as recited in claim 7, wherein said apparatus is selected from a group of mobile wireless devices consisting essentially of: personal digital assistants, satellite communication links, laptop computers, cellular telephones, interactive watches, package carrier tablets and vehicular data systems.

9. The apparatus as recited in claim 7, wherein said multimedia streams comprises audio content, video content, or a combination of video and audio content.

10. The apparatus as recited in claim 7, wherein said programming is configured for retrieval and storage of said second multimedia stream in response to device programming, learned behaviors, user settings, service provider settings, and/or content provider settings.

11. The apparatus as recited in claim 7, wherein said programming is further configured for storing in said memory at least portions of said first multimedia stream in response to device programming, learned behaviors, and/or user selections.

12. The apparatus as recited in claim 7, wherein data rate available to said second multimedia stream depends on activity of the first multimedia stream in response to user selections, and available bandwidth of a wireless communication channel.

13. The apparatus as recited in claim 7, wherein data rate available to said second multimedia stream is constrained to a minimum value in response to said first multimedia stream being subject to any bandwidth limitation during playback wherein playback data rate is less than available bandwidth.

14. The apparatus as recited in claim 7, wherein said computer is configured for decoding multimedia streams communicated using forward error correction techniques.

15. A method of non-interactive wireless playback of multimedia streams on a network device operable on a network subject to communication outages, comprising:
(a) establishing connectivity from a network device with said network;
(b) receiving a first stream of multimedia data from said network in response to user interaction;
wherein said multimedia data comprises audio content, video content, or a combination of video and audio content;
(c) monitoring the first stream against an available bandwidth;
(d) when not playing the first stream or when the first stream is played at a data rate less than the available bandwidth, receiving a second stream of multimedia data from said network non-interactively in response to device programming, learned behaviors, user set selection, content provider selection, and/or service provider selection;
(e) storing said multimedia data from said second stream within a data repository configured for storing multimedia data;
(f) periodically collecting content in said memory;
(g) detecting a communication outage between said network device and said network;
(h) alerting a user of the network device to the communication outage and either prompting the user to select from said multimedia data received from said second stream or playing back the periodically collected content in response to detecting said communication outage and based on a length of said communication outage; and
(i) playing back the second stream of multimedia data stored in said data repository in response to said communication outage and said prompting said user.

16. The method as recited in claim 15, further comprising detecting beacons prior to establishing said connectivity over the network.

17. The method as recited in claim 15, further comprising decoding multimedia streams communicated using forward error correction techniques.

18. The method as recited in claim 15, further comprising storing a portion of the multimedia data received from said first stream of multimedia data for playback during outages.

* * * * *